United States Patent [19]

Conti

[11] Patent Number: 5,130,655
[45] Date of Patent: Jul. 14, 1992

[54] MULTIPLE-COIL MAGNETIC FIELD SENSOR WITH SERIES-CONNECTED MAIN COILS AND PARALLEL-CONNECTED FEEDBACK COILS

[75] Inventor: Ugo Conti, El Cerrito, Calif.

[73] Assignee: Electromagnetic Instruments, Inc., El Cerrito, Calif.

[21] Appl. No.: 672,514

[22] Filed: Mar. 20, 1991

[51] Int. Cl.[5] .......................... G01V 3/28; G01V 3/10; G01R 33/02

[52] U.S. Cl. .................... 324/258; 324/247; 324/339; 324/346

[58] Field of Search ................. 324/219-221, 324/239, 242, 243, 247, 253-255, 258, 260, 339, 346

[56] References Cited

U.S. PATENT DOCUMENTS

| | | | |
|---|---|---|---|
| 3,187,252 | 6/1965 | Hungerford | 324/6 |
| 3,528,402 | 9/1970 | Abramowitz | 324/219 X |
| 4,636,731 | 1/1987 | Savage et al. | 324/338 |
| 4,719,420 | 1/1988 | Boimond | 324/243 X |

FOREIGN PATENT DOCUMENTS 2148012  5/1985  United Kingdom .

OTHER PUBLICATIONS

G. Clerc et al., "La cotre-reaction de flux applique aux . . .", Extract des Annales de Geophysique, Tome 20, n4 (Oct.-Dec. 1964).

"BF Series Magnetic Field Sensors", Electromagnetic Instruments Inc. (EMI). Brochure Dec. 14, 1990.

*Primary Examiner*—Gerard R. Strecker
*Attorney, Agent, or Firm*—Townsend and Townsend

[57] ABSTRACT

A borehole magnetic sensor includes a plurality of primary detector coils, aligned along parallel axes, and connected in series with each other. A corresponding plurality of feedback coils, each associated with a respective detector coil, are arranged to cooperate with an amplifier system to provide negative feedback and null the magnetic field through the detector coils. The feedback coils are connected in parallel.

4 Claims, 2 Drawing Sheets

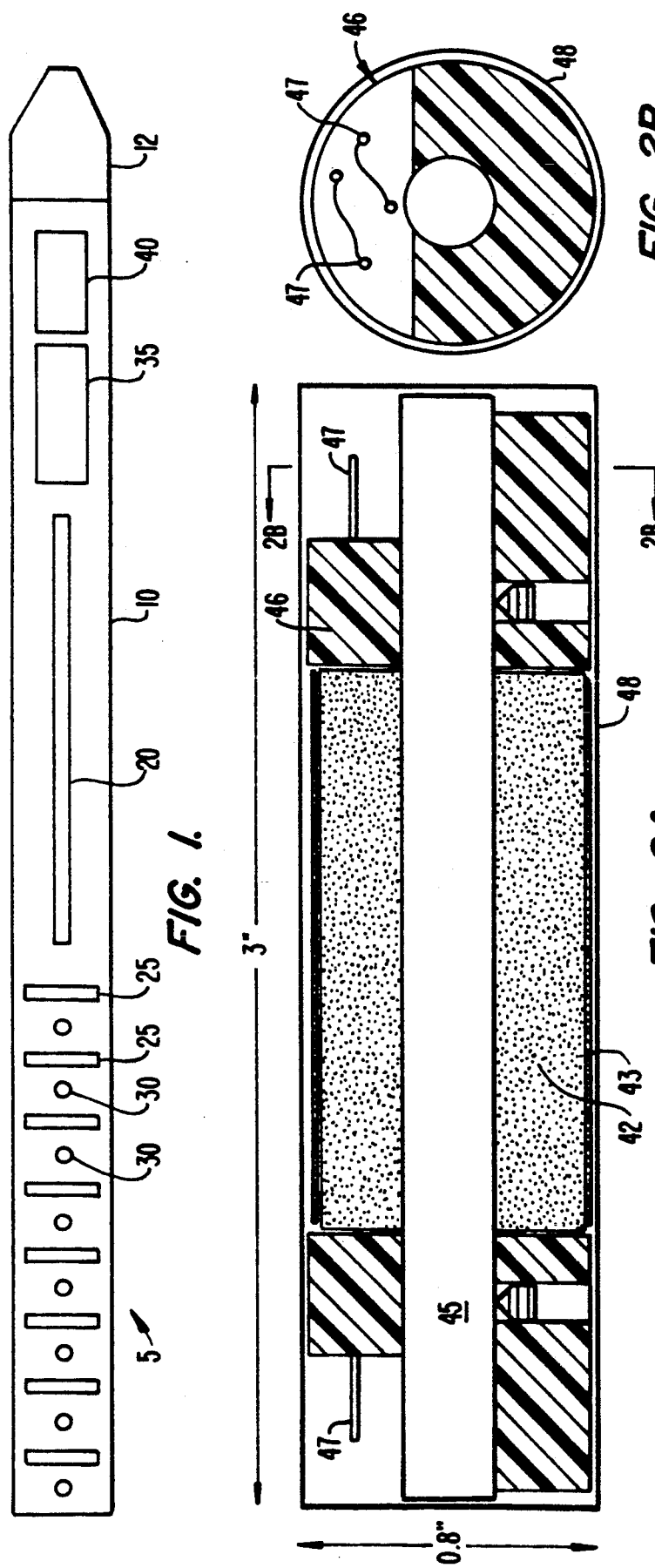
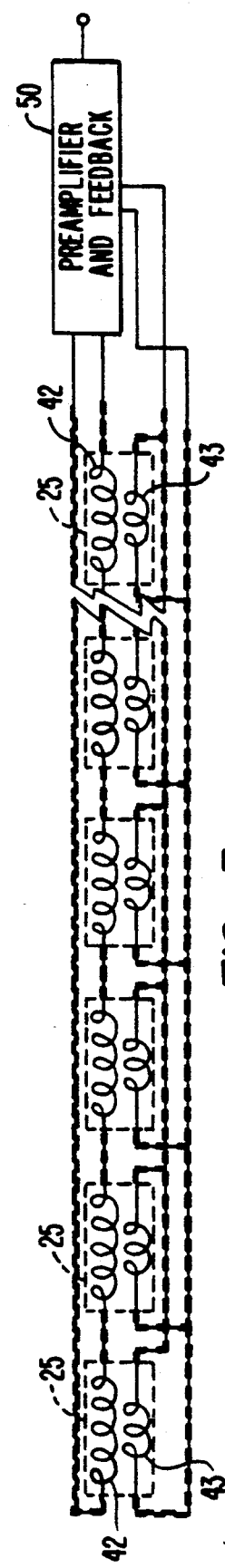

MULTIPLE-COIL MAGNETIC FIELD SENSOR WITH SERIES-CONNECTED MAIN COILS AND PARALLEL-CONNECTED FEEDBACK COILS

BACKGROUND OF THE INVENTION

The present invention relates generally to the measurement of magnetic fields, and more specifically to a borehole sensor having multiple coils for sensing horizontal field components.

In sub-surface geophysical exploration, a probe having sensors for measuring various physical parameters at different depths is lowered down a borehole. One type of measurement uses a magnetic field sensor to measure induced magnetic fields and thereby glean information regarding the possible presence of conductive ore bodies. Associated with the magnetic field sensor is a transmitter coil which, when energized, establishes a magnetic field. The field induces electrical currents in conductive regions in the vicinity, and the induced currents establish a magnetic field which is measured. By performing such measurements at various depths, it is possible to establish field profiles.

In certain applications, the transmitter coil is a large horizontal loop of wire which is laid out on the surface of the earth in the general vicinity of the borehole location. In other applications, the transmitter coil is a small diameter coil that is lowered into the borehole, possibly being physically located in the same housing as the sensor.

U.K. Published Patent Application No. 2,148,012 to Cobcroft discloses a borehole probe for measuring magnetic field components along the axis of the borehole and in the two transverse directions. Due to a limitation on the probe diameter, the transverse field components are measured by an array of short coils. The reference shows short coils for the axial coordinate, but a single long coil could also be used for the measurement along the borehole axis. The transmitter coil is on the earth's surface. U.S. Pat. No. 4,636,731 to Savage et al. discloses a similar arrangement with transmitter coils located within the borehole probe itself.

In operation, the induced fields penetrate the regions within the coils, and induce voltages proportional to the rate of change of the magnetic field (dB/dt). It is, however, known to provide a direct measurement of magnetic field by use of a feedback coil associated with and magnetically coupled to the detector's main coil. This technique is described by G. Clerc and D. Gilbert in "La cotre-reaction de flux appliquee aux bobines a noyau magnetique utilisee pour l'enregistrement des variations rapides du champ magnetique." Extract des Annales de Geophysique, Tome 20, n4 (October-December 1964). Briefly, the main coil is coupled to the input terminal of the amplifier, and an output signal is applied to the feedback coil which operates to cancel the magnetic field through the main coil. Thus, the main coil becomes a null detector and the feedback current is linearly proportional to the magnetic field.

SUMMARY OF THE INVENTION

The present invention provides a borehole magnetic sensor that provides the benefits of direct-B sensing in a multi-coil arrangement.

In short, a magnetic sensor according to the present invention includes a plurality of main detector coils, aligned along parallel axes, and connected in series with each other. A corresponding plurality of feedback coils, each associated with a respective main coil, are arranged to cooperate with an amplifier system to provide negative feedback and null the magnetic field through the main coils. The feedback coils are connected in parallel. This provides a detector with a response curve that is essentially flat over a very large frequency band.

A further understanding of the nature and advantages of the present invention may be realized by reference to the remaining portions of the specification and the attached drawings.

BRIEF DESCRIPTION OF THE DRAWINGS

FIG. 1 is a schematic view of a borehole sensor incorporating the magnetic field detector of the present invention;

FIGS. 2A and 2B are cross-sectional views of one of the horizontal field coil assemblies.

FIG. 3 is a high level schematic showing one of the horizontal field sensor arrays and associated electronics.

DESCRIPTION OF SPECIFIC EMBODIMENTS

Figure 4:
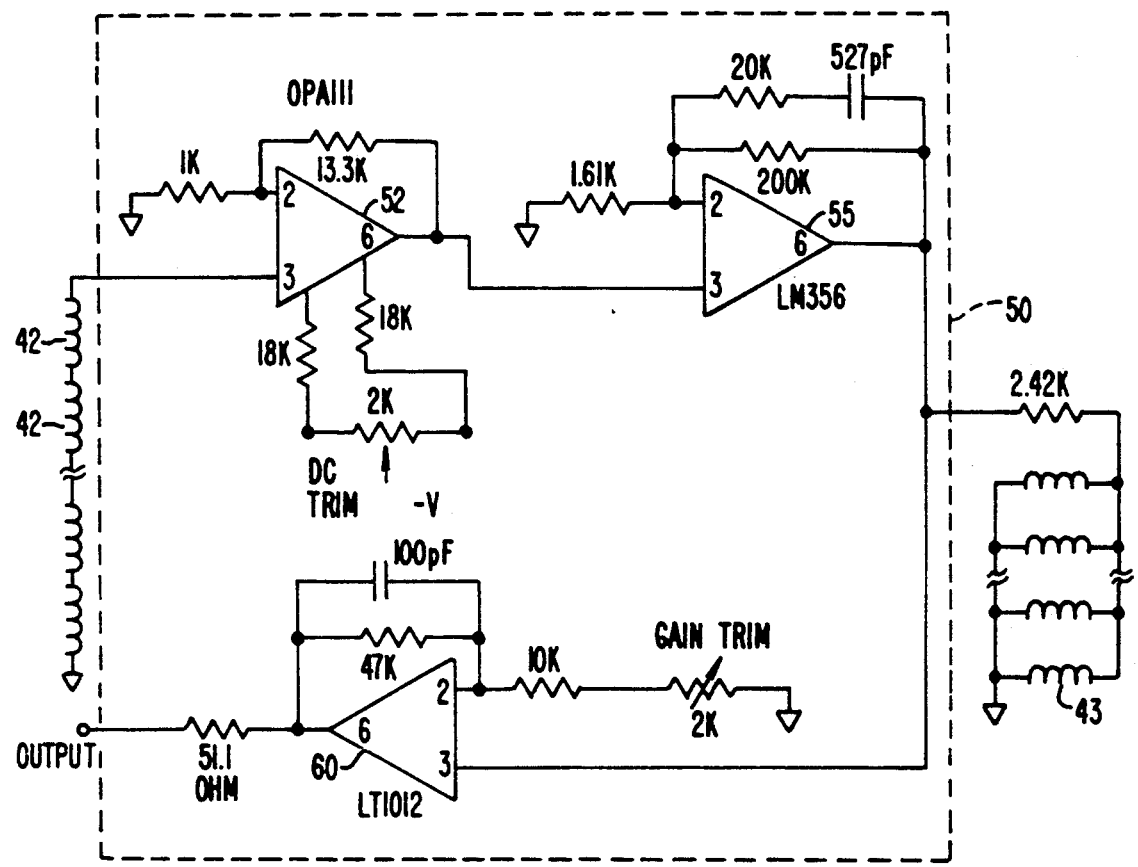
FIG. 4 is a circuit schematic of the electronics associated with each of the horizontal field sensor arrays.

FIG. 1 is a schematic of a borehole sensor 5 in which magnetic field sensors according to the present invention may be incorporated. Briefly, sensor 5 includes an elongated cylindrical housing 10 within which are located the sensors and control electronics as will be described below.

In use, the sensor is lowered into a borehole, and while the borehole is not necessarily vertical, the sensor will be described as if its longitudinal axis is vertical and the two transverse dimensions are horizontal. For definiteness, the z-axis will be defined to lie along the long axis of sensor 5, the x-axis will be defined as the transverse axis in the plane of the figure, and the y-axis will be defined as the transverse axis perpendicular to the plane of the figure. Housing 10 is closed at its normally lower end and terminates in a standard cable head 12 at its normally upper end. A typical overall length of the sensor is about 3-6 m.

The present invention relates to sensing time varying magnetic fields, typically the fields resulting from currents induced by a driving magnetic field, and to that end, the sensor includes circuitry and coils for sensing such magnetic fields. As a matter of nomenclature, the sensed magnetic field will sometimes be referred to as the external magnetic field. As noted above, the driving field may be generated by a transmitter coil within the probe or at a remote location. This can be on the surface or in a separate hole. Induced magnetic fields in three dimensions are sensed by a z-axis coil assembly 20, a set of x-axis coil assemblies 25, and a set of y-axis coil assemblies 30. Associated with the coil assemblies are receiver circuits and data processing electronics 35. Also located within the housing is data transmission circuitry 40 for converting the data to a form suitable for communication to above-ground computers. In many applications only the magnitude of the magnetic field vector is of interest, and so the orientation of the sensor is not significant. To the extent that directional information is required, a commercially available gyroscope assembly can be included in the housing.

The z-axis coil assembly comprises a single main coil having about 10,000 turns and a coaxial, generally coextensive feedback coil having about 200 turns. The z-axis coil assembly, is typically about 50–100 cm long and 2–3 cm in diameter. These coils and their connections to the z-axis receiver are generally standard and will not be described further.

FIGS. 2A and 2B are longitudinal and transverse cross-sectional views of one of x-axis coil assemblies 25. There are typically 6–10 x-axis coil assemblies and the same number of y-axis coil assemblies. Each of coil assemblies 25 includes a main coil 42 having about 5,000 turns and a coaxial, generally coextensive feedback coil 47 having about 100 turns. The coils are typically about 6–10 cm long and 2–3 cm in diameter. The coils are wound around a ferrite core 45, and are axially bounded by TEFLON ® synthetic resin bushings 46. Winding terminal pins 47 protrude through one bushing for the main coil and the other for the feedback coil. The coil assembly is enclosed in an electrostatic shield 48.

FIG. 3 is a high level schematic showing the x-axis field sensing arrangement. It should be understood that the y-axis arrangement is substantially the same. The main coils are connected in series to the input of a pre-amplifier 50. Associated with the pre-amplifier is a feedback connection to which the feedback coils are connected in parallel. As will be discussed below, the current through the feedback coils is directed so that the magnetic field generated by the feedback coil cancels the external magnetic field through the coil assembly. All coil connections are also provided with electrostatic shielding.

FIG. 4 is a circuit schematic illustrating the specific amplifier and feedback circuitry. The preamplifier includes three stages of amplification. The first stage comprises an operational amplifier 52 having a low bias current. Amplifier 52 is provided with a DC trim adjustment to set the DC level of the output signal. The output signal is communicated to a second amplifier 55, which is a general purpose high speed amplifier. Amplifier 55 is provided with a resistor-capacitor network 57 in order to enhance the low frequency response since the coil response is inherently lower at low frequency. The output from amplifier 55 is communicated to the parallel connected feedback coils 43 and to a third amplifier 60, which operates as a gain stage to provide a signal suitable for transmission to the surface. The output from the pre-amplifier is on the order of 200 mv/nT, with a flat frequency response over the range of approximately 10 Hz to 100 kHz.

The operation of the circuitry is as follows. The magnetic field through the main coil (produced as a result of the transmitter coil) generates a voltage at the input to operational amplifier 52. The voltage is amplified, and if there were no feedback, it would be proportional to the rate of change of the external magnetic field. However, a current proportional to the amplified voltage is passed through the feedback coils in a direction as to produce a field through the main coil that cancels the external field. The negative feedback connection and the characteristics of amplifiers 52 and 55 are such that the voltage input to amplifier 52 is nulled. Since the magnetic field generated by the feedback coil is proportional to the current through the feedback coil, that current (and hence the output voltage) must be proportional to the external field rather than its rate of change.

While the above is a complete description of a number of embodiments, various modifications, alternatives, and equivalents may be used. For example, while the preferred embodiment uses coaxial feedback coils, there may be other arrangements where the main coil is coupled to its associated feedback coil characterized by sufficient mutual inductance that a properly directed current through the feedback coil causes a field that cancels the external field through the main coil. Additionally, while specific geometric dimensions and numbers of turns are given, those parameters can be varied to provide different operating characteristics. For instance, a larger number of turns or a longer coil can be used to increase the low frequency response. Therefore, the above description should not be taken as limiting the scope of the invention which is defined by the appended claims.

What is claimed is:

1. A magnetic field sensor for use in combination with an amplifier having an input terminal and an output terminal for sensing a time-varying external magnetic field comprising:
   a plurality of main coils, each having a respective coil axis aligned along a respective one of a corresponding plurality of parallel axes, said main coils being connected in series with each other; and
   a corresponding plurality of feedback coils, each associated with and inductively coupled to a respective main coil, said feedback coils being connected in parallel with each other;
   whereby when said main coils are coupled to the input terminal, said feedback coils are coupled to the output terminal, and the external magnetic field has a component along said parallel axes, said feedback coils provide magnetic fields that cancel the component of external magnetic field through said main coils, whereupon the amplifier provides a signal at the output terminal that represents the component of external magnetic field.

2. The magnetic field sensor of claim 1 wherein each feedback coil is coaxial and generally coextensive with its associated main coil.

3. A magnetic field sensor for sensing and providing a signal representing a time-varying external magnetic field, comprising:
   a plurality of main coils, each having a respective coil axis aligned along a respective one of a corresponding plurality of parallel axes, said main coils being connected in series with each other;
   a corresponding plurality of feedback coils, each associated with and inductively coupled to a respective main coil, said feedback coils being connected in parallel with each other;
   an amplifier having an input terminal coupled to said series-connected main coils;
   means coupled to said amplifier for feeding a current to said parallel-connected feedback coils, the current through each feedback coil being of a magnitude and direction to generate a magnetic field that cancels the external field; and
   means for providing a signal proportional to said current, said signal thus representing the external magnetic field.

4. The magnetic field sensor of claim 3 wherein each feedback coil is coaxial and generally coextensive with its associated main coil.

* * * * *